US007658688B2

(12) United States Patent
Weidner (10) Patent No.: US 7,658,688 B2
(45) Date of Patent: Feb. 9, 2010

(54) EXTREME BASEBALL GAME

(76) Inventor: Phil Weidner, 831 Oleander Ave., Holly Hill, FL (US) 32117

(*) Notice: Subject to any disclaimer, the term of this patent is extended or adjusted under 35 U.S.C. 154(b) by 68 days.

(21) Appl. No.: 11/982,615

(22) Filed: Nov. 2, 2007

(65) Prior Publication Data

US 2008/0125253 A1    May 29, 2008

Related U.S. Application Data

(60) Provisional application No. 60/856,414, filed on Nov. 3, 2006.

(51) Int. Cl.
*A63B 69/00* (2006.01)
*A63B 67/00* (2006.01)

(52) U.S. Cl. ............... 473/416; 473/451; 473/465; 473/468

(58) Field of Classification Search ......... 473/416, 473/465, 468, 5; 273/236, 244, 259; 463/3, 463/36, 37
See application file for complete search history.

(56) References Cited

U.S. PATENT DOCUMENTS

| | | | | |
|---|---|---|---|---|
| 4,327,914 A * | 5/1982 | Dowell | ............... | 273/244.2 |
| 4,657,254 A * | 4/1987 | Renner | ............... | 273/244 |
| 4,672,541 A * | 6/1987 | Bromley et al. | ............... | 463/3 |
| 4,758,002 A * | 7/1988 | Murphy | ............... | 473/468 |
| 4,798,389 A * | 1/1989 | Long | ............... | 473/468 |
| 4,881,735 A * | 11/1989 | Orsatti | ............... | 473/499 |
| 4,973,061 A * | 11/1990 | Catherall | ............... | 473/468 |
| 5,411,259 A * | 5/1995 | Pearson et al. | ............... | 463/36 |
| 5,540,440 A * | 7/1996 | Liu | ............... | 273/259 |
| 6,419,230 B1* | 7/2002 | Cass | ............... | 273/244 |
| 6,605,011 B1* | 8/2003 | Yamamoto et al. | ............... | 473/455 |
| 7,131,918 B1* | 11/2006 | Prince | ............... | 473/468 |
| 2003/0176243 A1* | 9/2003 | Joseph et al. | ............... | 473/415 |

* cited by examiner

*Primary Examiner*—Mitra Aryanpour
(74) *Attorney, Agent, or Firm*—Frank B. Arenas, Esq.

(57) ABSTRACT

A unique playing field and method of playing extreme baseball, a game of traditional baseball modified by rules to allow two teams to play at the same time on the same field, is disclosed.

1 Claim, 6 Drawing Sheets

EXTREME BASEBALL GAME

This U.S. Non-Provisional Utility application for patent incorporates by reference (to the extent that does not conflict with the disclosure contained herein) and claims the benefit and priority of U.S. Provisional Application having Ser. No. 60/856,414 and filed Nov. 3, 2006 for "Extreme Baseball Game" commonly owned with this application.

BACKGROUND OF THE INVENTION

1. Field of the Invention

Versions and embodiments of the present invention relate generally to games. More particularly, versions of the invention relate to games played for amusement, sport and/or competition between teams engaged in sports governed by rules. Specifically, a version of the invention relates to baseball and new, useful and unobvious versions thereof.

2. Description of the Related Art

As is well understood by one skilled in the art, for many years the game of baseball has been an American tradition. The traditional game of baseball has changed very little over the years; even today the professional leagues do not allow the new aluminum baseball bats due to tradition and customs of the game.

Over the years, the players and spectators of baseball have changed along with society. Today's society, especially in America, expect a fast pace and action in popular games and sports. Skydiving, skate boarding, bike riding and other sports have left the traditional path and evolved into "extreme" sports—skydiving with sky surfing and freestyle, skate boarding with ramps, rails and jumps, and bike riding with ramps and jumps including flips and mid-air gymnastics. These new "extreme" versions of these old sports have re-invented them into something new and exciting for today's players and spectators of these sports. What is needed today for baseball is an "extreme" version for today's society. This new, useful and unobvious "Extreme Baseball Game" solves this need. What makes it Xtreme? Versions of the game are played with both teams on the field at the same time, two pitcher's mounds, two home plates, etc.

It is an object of versions of the invention to achieve a new game of baseball that is more exciting and has more action than conventional baseball. This object is accomplished by at least one, some or all versions of the present invention.

SUMMARY OF THE INVENTION

The present versions of the invention address at least one, some or all of the above-referenced needs in the art by providing a new, useful and unobvious game and/or sport. Versions of the invention may be used as a game (or sport) in an open grass field played with real human participants. Other embodiments use a standard baseball diamond and outfield. Another version uses a modified baseball diamond and outfield, with or without organized sports leagues, professional and/or amateur. Yet another version uses a computer to simulate the game for at least one player. Alternate embodiments utilize the Internet and World Wide Web (WWW) for at least one, a plurality, some or many players to interact, compete and entertain themselves, alone or in combination, with the video game as virtual participants.

Benefits, features and problems solved by versions of the invention include: success in stimulating players and spectators of versions of "Extreme Baseball" to interact, compete and play with a faster pace than traditional baseball. Versions of the invention improve relations with the local community for the players and spectators by offering the local community the opportunity to observe an action game in conjunction with fund raisers, sponsors, music, art and/or advertising venues.

The foregoing objects, benefits and advantages of versions of the invention are illustrative of those which can be addressed by versions of the invention and not intended to be limiting or exhaustive of the possible advantages that can be realized. These and other advantages will be apparent from the description herein or can be learned from practicing versions of the invention, both as embodied herein as examples or as modified in view of any variations which may be apparent to those of ordinary skill in the art. Therefore, the invention resides in the novel devices, methods, arrangements, systems, combinations and improvements herein shown and described as examples and not limited therein.

It is understood that the versions of the inventions are new playing fields, methods, rules, player type(s) and modified playing field(s) for playing baseball with more action between opposing teams to stimulate more excitement for the players and spectators than traditional (or conventional) baseball.

BRIEF DESCRIPTION OF THE DRAWINGS

In the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

It should be understood that in certain situations for reasons of manual or computational efficiency or ease of maintenance, the ordering of the blocks of the illustrated flow charts could be rearranged or moved inside or outside of the illustrated loops by one skilled in the art. While the present invention will be described with reference to the details of the embodiments of the invention shown in the drawings (and some embodiments not shown in the drawings), these details are not intended to limit the scope of the invention.

DETAILED DESCRIPTION OF THE PREFERRED EMBODIMENT

Figure 2:
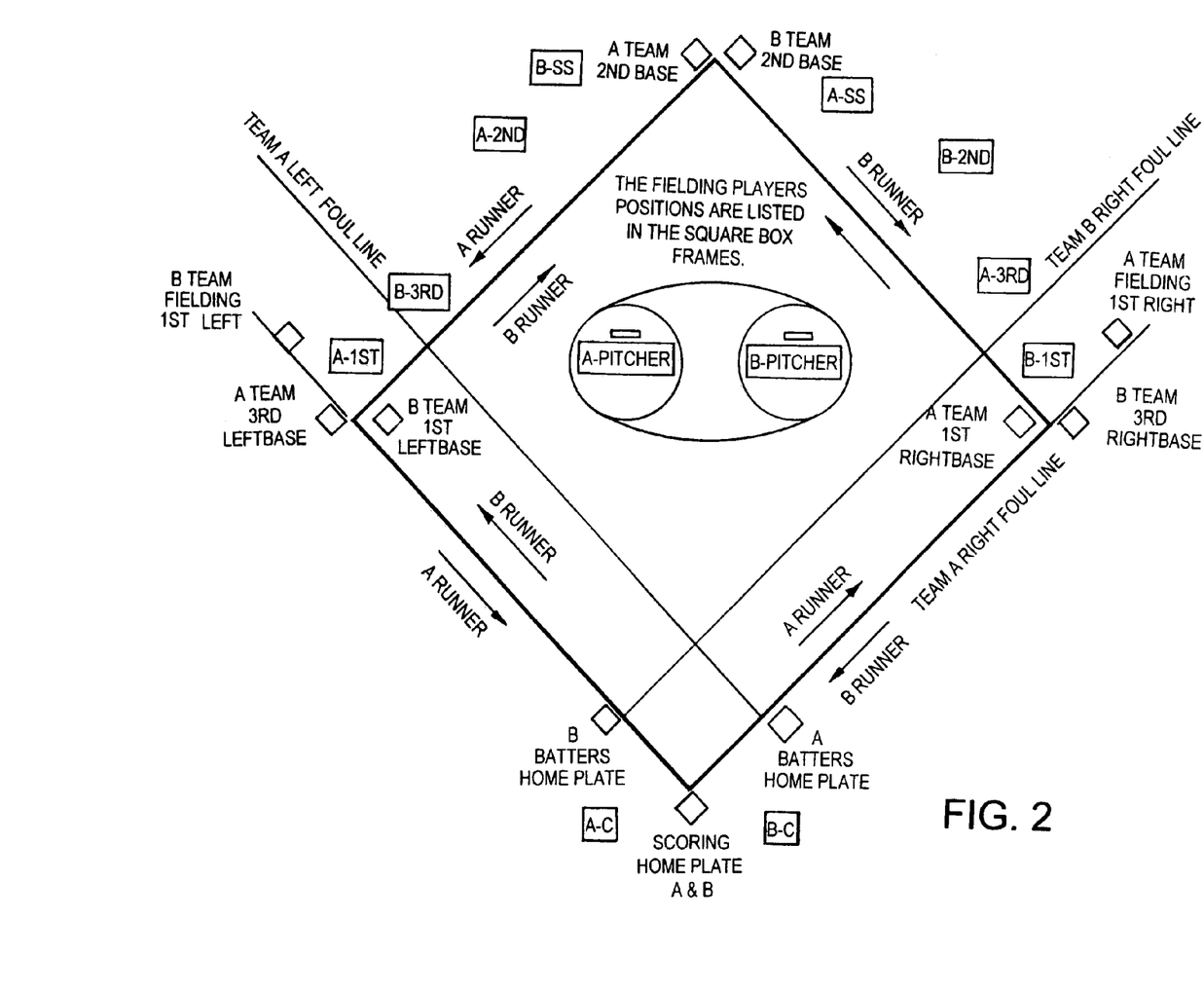
FIG. 2 is a plane view of another embodiment of the game.

The core of the version of the preferred embodiment of the invention is depicted in FIG. 2. The basics of the game are played similarly to traditional baseball but both teams play the field and bat at the same time. The text of FIG. 2 explains the typical conceptual outline and rules of the preferred embodiment of the game.

It is also understood that whenever and/or is used in this patent application it means any combination or permutation of all, one, some, a plurality or none of each of the item or list mentioned, which is not intended to be limiting but merely for example and illustration. It is also understood that (s) designates either singular or plural. It is also understood that that "or" is an inclusive "or" to include all items in a list and not intended to be limiting and means any combination or permutation of all, one, some, a plurality or none of each of the item or list mentioned. It is also understood that "including" means "including but not limited to" any combination or permutation of all, one, some, a plurality or none of each of the item or list mentioned.

Figure 1:
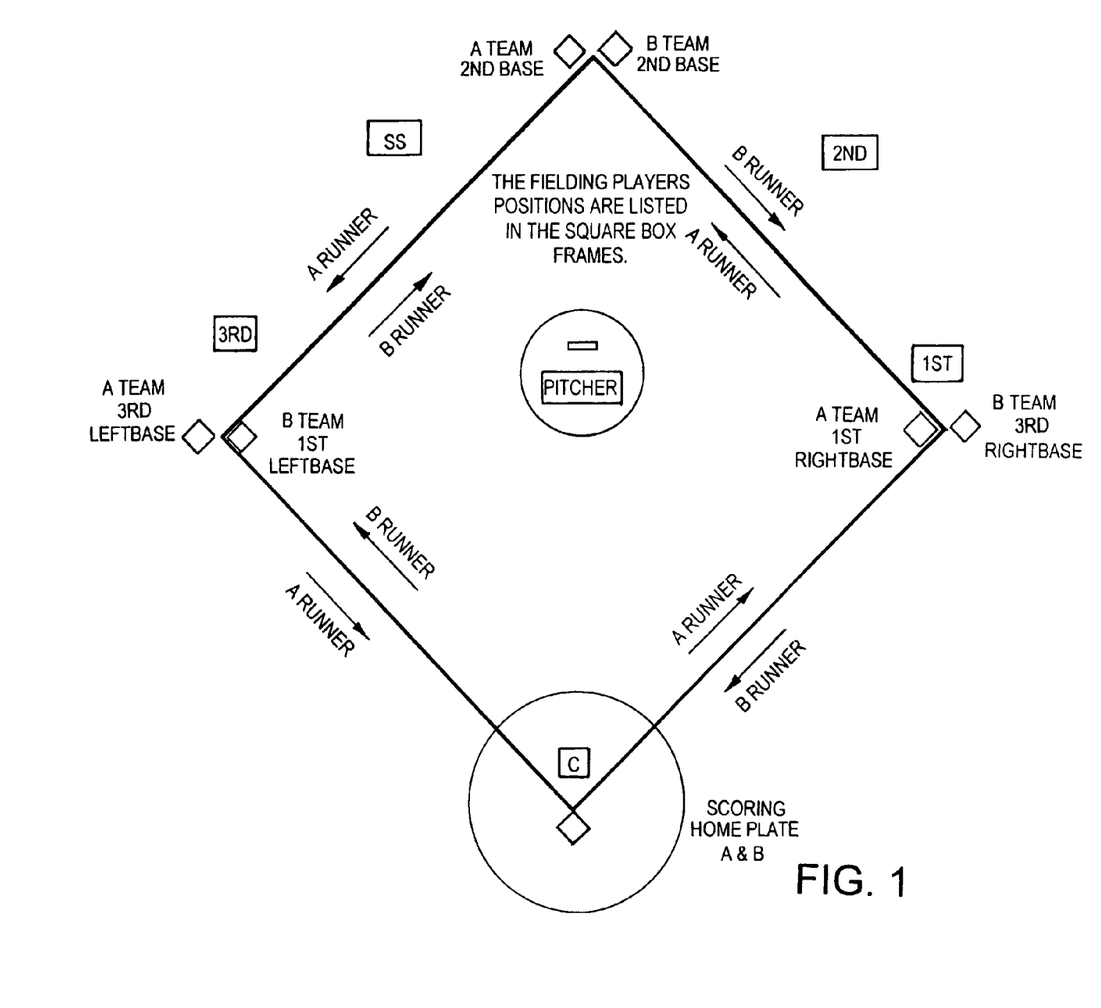
FIG. 1 is a plan view of an embodiment of the game.

The simplest form of the invention is depicted in FIG. 1. Here, a modified baseball diamond is used, with or without an outfield. The same rules of basic baseball are followed but modified in that the base runner direction changes after each hitter advances.

Another embodiment is disclosed in FIG. 2. A playing field used for an alternative method of playing baseball, the field comprising of:
A: two pitchers mound
B: one first base on opposing sides of the playing field
C: two 2nd bases side by side
D: two third bases on opposing sides of the playing field
E: two batting bases side by side
F: one scoring/fielding home base
G: two foul lines on each side of the playing field
H: two fielding 1st bases extended on opposing sides of the playing field.

The method of play comprising the steps of:
Two teams playing on the playing field at the same time consisting of two fielding teams (Team A & B) and two batting teams (Teams A & B)
Team's A & B alternate pitches to the opposing batting teams after each pitch is thrown.
Team A Batters use the home batting plate on the right side of the field and Team B Batters use the batting plate on the left side of the playing field
Team A batters run the bases in the counter clockwise direction.
Team B batters run the bases in the clockwise direction.
Team's A & B base runners use the base located inside of the base line for the 1st Base and use the base on the outside of the baseline for the 3rd Base.
Team A base runners use the base on the left side of the field for the 2nd Base and Team B use the base on the right side of the field for the 2nd Base
Team A&B base runners and fielders us an extended "Fielding 1st Base" (see diagram) to field the initial hit ball. If the base runner wishes to run extra bases during the initial hit he is allowed to advance from the extended 1st Base. If he chooses not to advance from 1st base he then stays on the extended 1st base and the game resumes.
Team A Batters use the home batting plate on the right side of the field and Team B Batters use the batting plate on the left side of the playing field
Teams A&B use a separate home plate for scoring and fielding.
Teams A & B innings are over when both teams have made 3 outs. The fielding team that made 3 outs first may leave the playing field until the opposing team makes their 3 outs.
Being that that the teams play simultaneously during each inning there is not a top or bottom of innings as in traditional baseball.
Teams A & B playing mode is in effect when the pitchers foot is on the mound during the pitch rotation. During this play mode base runners, in exception to runners on 3rd base, may lead off their base and may be picked off.
Team A & B 3rd base runners may not lead off the base until the pitcher advances his throw towards the batter.
Teams A & B base runners that are not in playing mode (according to above conditions) must stand on there bag. If they leave the bag for any reason during this mode they are out.
Teams A & B fielders that are not in playing mode (according to above conditions) must remain still. If they make any moves in any direction in which they interfere with the play at hand then the hitter and all other base runners (if any) are safe.
An exception to the condition above occurs only when a play advances to the home plate. When a base runner advances to home base the opposing teams hitter and team mate catcher must leave the batting circle. If the opposing teams hitter interferes with the play the base runner is safe at home. If the teams catcher interferes with the opposing teams catcher then the base runners is out at home.
If Teams A & B batters ball hits one of their own fielding team members after hitting a ball then the batter is automatically out the base runners (if any) must return to their original base.

Optional Additional Game Situation:
Hot Box Effect (See Diagram)

General Baseball Rules Apply:
3 outs per team per inning, 4 balls=walk 3 strikes=out, 1st two foul balls are strikes, 9 innings per game.
Half-time: Like football or basketball etc. this baseball version will consist of a half-time segment to allow the players to rest. The segment will take place after the 6th inning. The segment duration can last 10-20 min which can be determined at the beginning of each game.

To make the invention in its preferred embodiment, one skilled in the art would construct a modified baseball diamond and outfield as shown in FIG. 2, using the additional home, first, second and third bases for each Team A and Team B. The off-set foul lines and main base running lines are typically marked in chalk per traditional baseball or could be painted or marked in other ways desired by the players of the game, as depicted in FIG. 2.

To use the invention in this embodiment, both teams take the field and alternate pitching to each other pursuant to at least one, some, a plurality or all of the rules in text as written in FIG. 2.

In another embodiment, a Web site is established on the WWW by the game operator via an ISP (Internet Service Provider) using HTML, XML or any other suitable programming language. The web site home page is an inquiry electronic form page to register to play the game and a simulated playing field on the video monitor. The procedures for the use, navigation, input of data and interaction with the web site are well known in the industry such as point-and-click on hyperlinks with a computer mouse computer input device, filling in electronic forms, sending/receiving email, speaking to the web site and listening to the web site via Voice over Internet Protocol (VoIP) The players may communicate in question and answer format via a voice synthesizer connected to a processor. The web page input data is evaluated by the game operator. The input data may be stored in computer memory, statistics kept, virtual teams formed with other online players, etc. in a like manner of the current virtual games available on the Internet today, well known in the art.

The above-referenced menus, lists, options, functions, instructions, commands, sub-commands, applications, interactions, items, products, goods, groups and sub-groups are merely intended as illustration and examples, and are not intended by the inventor to in any way limit the addition, deletion or modification of any said menus, lists, options, functions, instructions, commands, sub-commands, applications, interactions, items, products, goods, groups and subgroups as might be desirable or useful to someone skilled in the art.

Some examples of embodiments of the invention may be illustrated. For example the invention may be practiced with a laptop computer comprising sufficient hardware, software, accessories and peripheral devices or such gaming computers now available such as the Xbox or Playstation, etc.

Or, the invention may be practiced with a computer system in communication (either wired or wireless) with at least one other computer or at least one remote input device further comprising sufficient hardware, software, accessories and peripheral devices interacting with other optional entities' data to generate input/output via cell phone, smart phone and/or email or other smart device. A smart device is hereby defined as a cell phone integrated with a computer or a computer integrated with a cell phone.

Or, the invention may be practiced with a computer system (server) further comprising sufficient hardware, software (WWW browser and/or email program), accessories and peripheral devices based at an Internet Service Provider (ISP) location in communication via the Internet and/or World Wide Web (WWW) via HTTP from the server to a client or with other computers or other remote input devices comprising sufficient hardware, software (WWW browser and/or email program), accessories and peripheral devices, and HTML or XML electronic preconfigured forms/monitor screens for input of players of the game using any other types of electronic communications (either wired or wireless). All components of the above-mentioned system are well known in the art.

Figure 3:
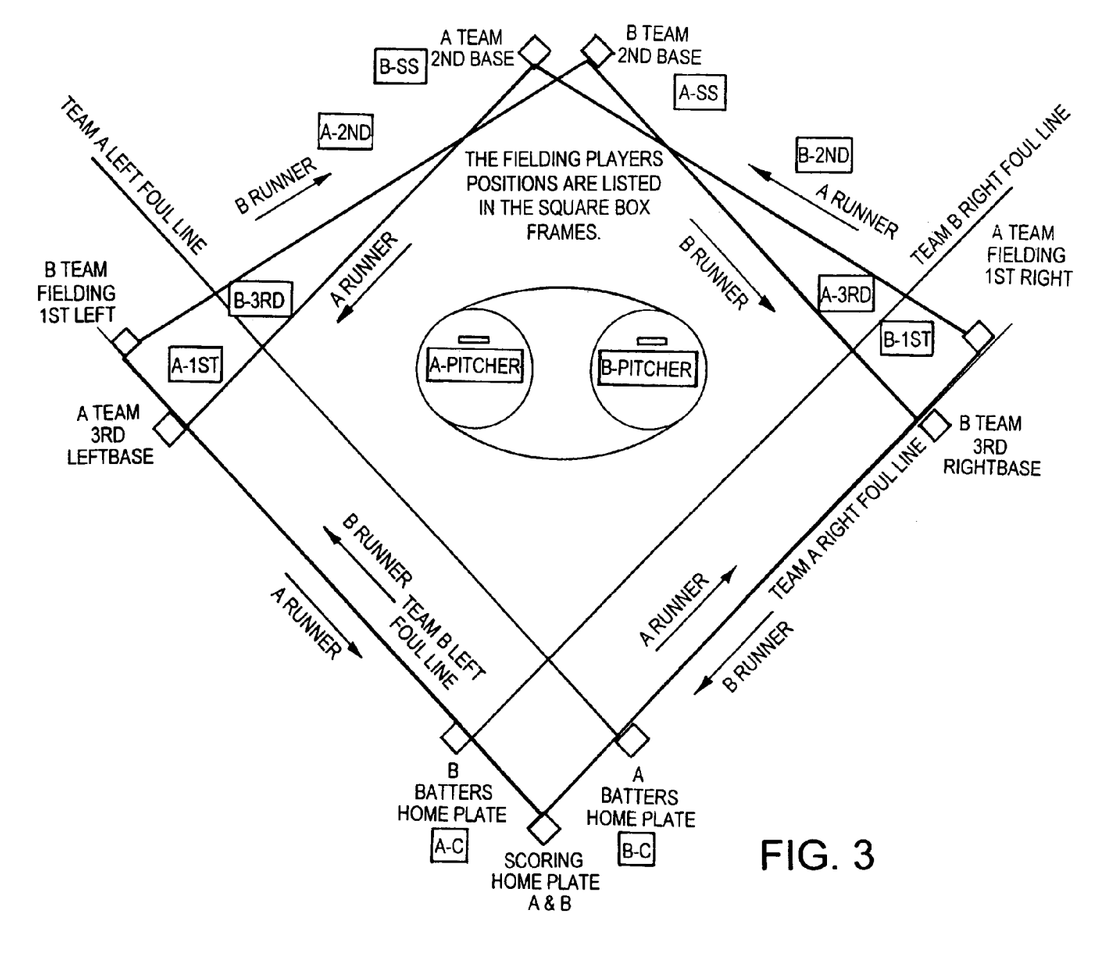
FIG. 3 is a plan view of another embodiment of the game.
Figure 4:
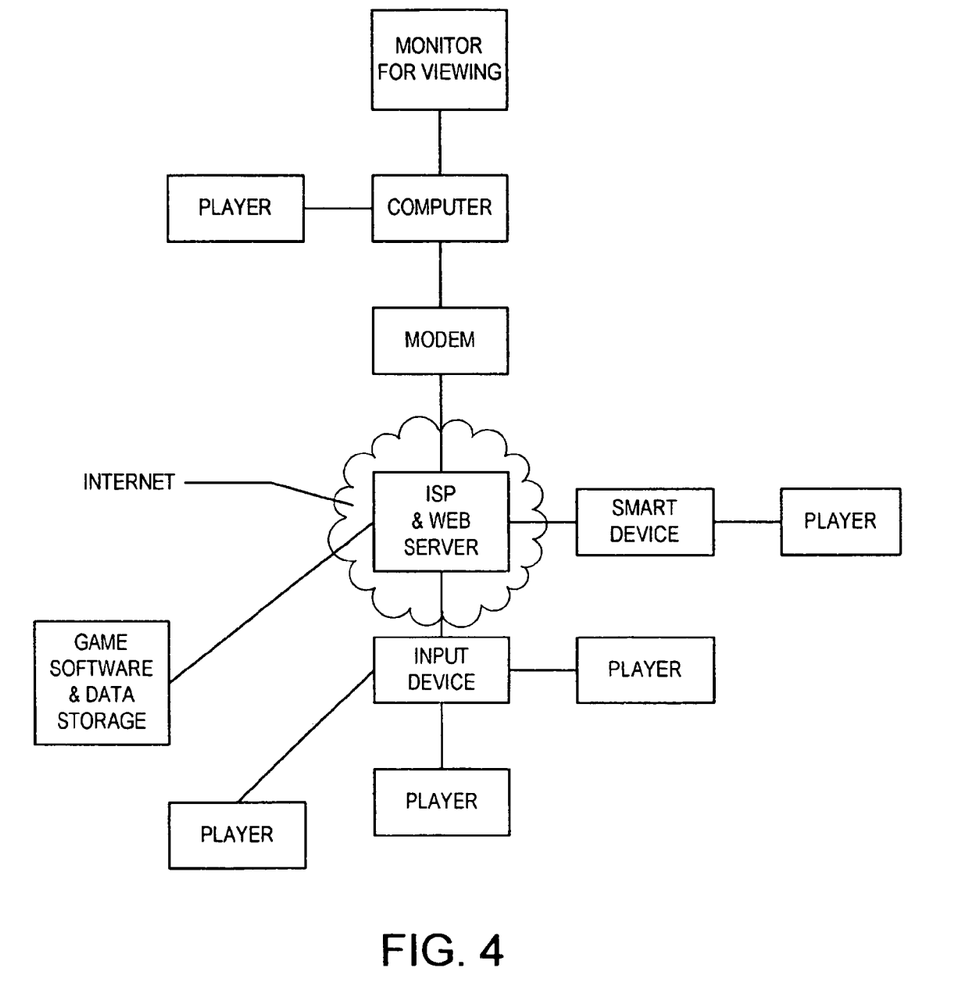
FIG. 4 is a schematic drawing of the web site interaction for Internet-based game versions of the invention.
Figure 5:
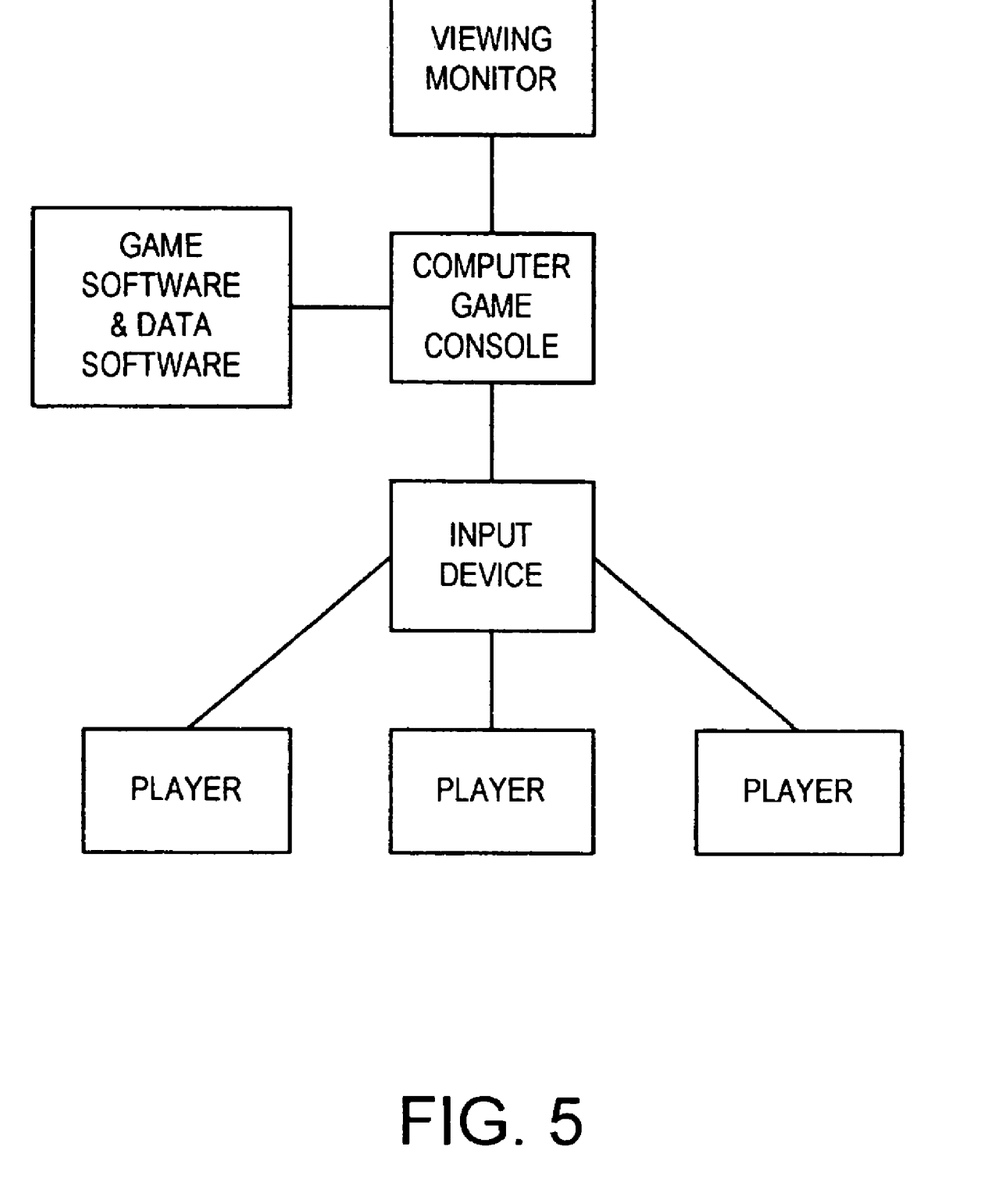
FIG. 5 is a schematic drawing of the computer-based video game version of the invention.

As a process or method, the invention may be practiced by an operator (such as a player or team of players) comprising the steps as disclosed in the text of FIG. 2 and/or FIG. 3 and the following: A playing field used for an alternative method of playing baseball, the field (either real or virtual) comprising of:
A: two pitchers mounds side by side
B: two first bases on opposing sides of the playing field
C: two 2nd bases side by side
D: two third bases on opposing sides of the playing field
E: two batting bases side by side
F: one scoring/fielding home base
G: two foul lines on each side of the playing field
H: two fielding 1st bases extended on opposing sides of the playing field.

A method of playing a game comprising of:
Two teams playing on the playing field at the same time consisting of two fielding teams (Team A & B) and two batting teams (Teams A & B)
Team's A & B alternate pitches to the opposing batting teams after each pitch is thrown.
Team A Batters use the home batting plate on the right side of the field and Team B Batters use the batting plate on the left side of the playing field
Team A batters run the bases in the counter clockwise direction.
Team B batters run the bases in the clockwise direction.
Team's A & B base runners use the base located inside of the base line for the 1st Base and use the base on the outside of the baseline for the 3rd Base.
Team A base runners use the base on the left side of the field for the 2nd Base and Team B use the base on the right side of the field for the 2nd Base
Team A&B base runners and fielders us an extended "Fielding 1st Base" (see diagram) to field the initial hit ball. After the initial play is over the base runner then uses the ("Base Running" 1st Base") from that point further. If the base runner wishes to run extra bases during the initial hit he is allowed to advance from the extended 1st Base
Team A Batters use the home batting plate on the right side of the field and Team B Batters use the batting plate on the left side of the playing field
Teams A&B use a separate home plate for scoring and fielding.
Teams A & B's innings are over when both teams have made 3 outs. The fielding team that made 3 outs first may leave the playing field until the opposing team makes their 3 outs.
Being that that the teams play simultaneously during each inning there is not a top or bottom of innings as in traditional baseball.
Teams' A & B playing mode is in effect when the pitchers foot is on the mound during the pitch rotation. During this play mode base runners, in exception to runners on 3rd base, may lead off their base and may be picked off.
Teams' A & B 3rd base runners may not lead off the base until the pitcher advances his throw towards the batter.
Teams' A & B base runners that are not in playing mode (according to above conditions) must stand on there bag. If they leave the bag for any reason during this mode they are out.
Teams' A & B fielders that are not in playing mode (according to above conditions) must remain still. If they make any moves in any direction in which they interfere with the play at hand then the hitter and all other base runners (if any) are safe.
An exception to the condition above occurs only when a play advances to the home plate. When a base runner advances to home base the opposing team's hitter and team mate catcher must leave the batting circle. If the opposing team's hitter interferes with the play the base runner is safe at home. If the teams catcher interferes with the opposing teams catcher then the base runners is out at home.
If Teams A & B batters ball hits one of their own fielding team members after hitting a ball then the batter is automatically out the base runners (if any) must return to their original base.

Optional Additional Game Situation:
Hot Box Effect (See Diagram)

Figure 6:
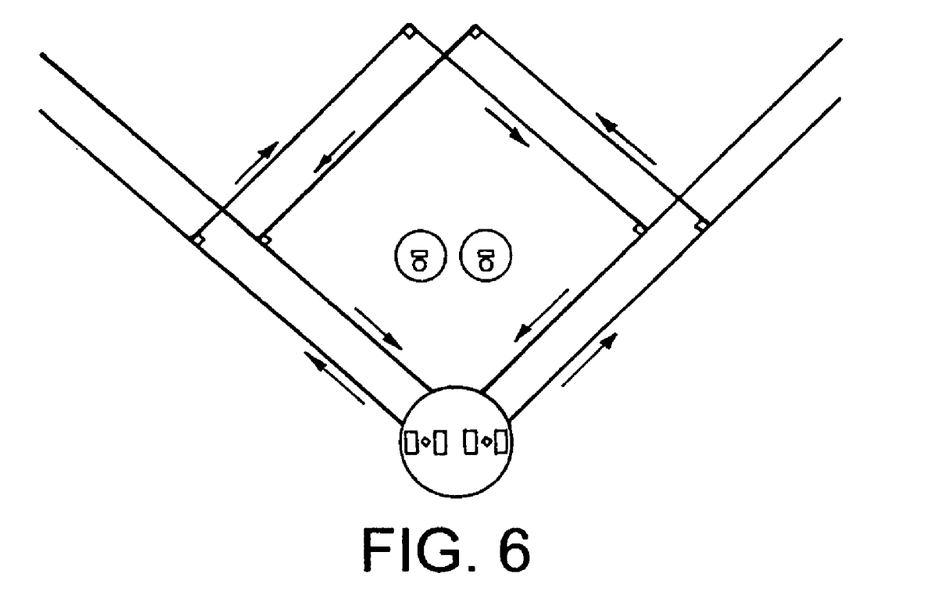
FIG. 6 is a plan view of another version of the field.

General Baseball Rules Apply:
3 outs per team per inning, 4 balls=walk 3 strikes=out, 1st two foul balls are strikes, 9 innings per game.
Half-time: Like football or basketball etc. this baseball version will consist of a half-time segment to allow the players to rest. The segment will take place after the 6th inning. The segment duration can last 10-20 min which can be determined at the beginning of each game.
Another Xtreme Baseball Alternate Version of the Invention: As shown in FIG. 6, this version of Xtreme Baseball uses many traditional rules of baseball which keeps the format of the game safe to play and well organized. The base lines are 5-6 feet apart, creating a double-diamond effect. The pitchers alternate turns to opposing batters. The team batting on the spectator's left side, will run the Flip Side of the bases.

(Clockwise). This game is very fast-paced and the players must be in top physical condition. So far one of the best elements of this new format is its time efficiency. A high scoring game, which normally can take 3 hours, can now be played in 2 hours. One of the main reasons for this is because this format does not need to break between each ½ inning. Being that the top and the bottom of the innings are played in concession there's actually no need to break during the entire game. As of now, however, the game does take breaks after the 2nd, 4th, 6th and 8th innings. Other new elements and versions of the game include instant replay or umpire contesting in which certain calls can be overruled and team pitching/batting/fielding variations.

Pitching & Batting:

An Inning starts with the pitcher on the right side of the field called the WEID SIDE throws to the batter on the same side. The batter then attempts to hit the ball. If he hits the ball he then runs the traditional way around the bases. After the pitcher throws a pitch on the Weid Side the Pitcher on the left-side of the field called the FLIPSIDE throws to the batter on that side. If the batter hits the ball he then runs the field in clockwise direction (opposite of the traditional direction). Then the pitchers continue alternating pitches.

Fielding:

The fielding players for both teams play on the field at the same time. When their team pitches the ball they are in LIVE MODE. If the ball is hit to them they field the ball to the WEID SIDE bases or the Flip Side bases depending on what side they are fielding. As soon as the play is over the other team pitches and are placed in LIVE MODE INNINGS; 3 Outs Per Side.

The defensive team that gets 3 outs first leaves the field and continues offensively until the opposing defensive team makes 3 outs. When each team makes 3 outs the inning is over. After each inning the teams switch sides.

Figure 7:
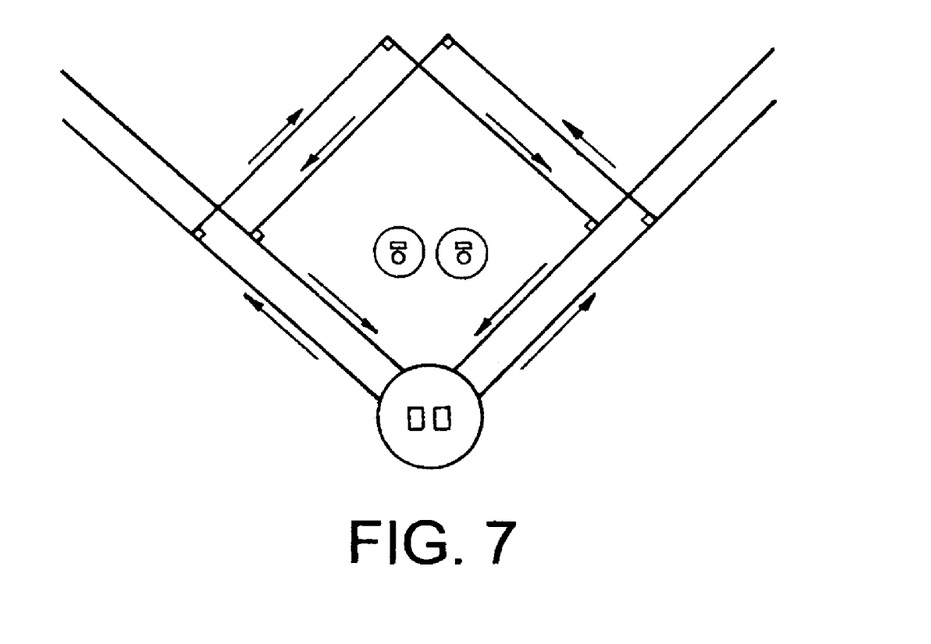
FIG. 7 is a plan view of another version of the field.

Another Xtreme Baseball Alternate Version of the Invention: As shown in FIG. 7, this method/version creates more extreme elements by adding exciting base running situations which requires intense concentration from the infielders. It utilizes the same double diamond field layout however only one defensive and offensive team play on the field at the same time. (see offensive and defensive descriptions below). This version can be played together during a game utilizing an alternate version as bonus innings or could be played in its entirety during all innings of play.

Defense:

This version is played with one defensive team on the field at a time however includes two pitcher and catcher playing on the weid side and the flip side of the diamond. The pitchers on the wide side and flip side alternate pitches the same way as version 1. The fielders defend both the flip and wide side basses. Defensive teams consist of a total of 11 players. (seven fielders, two catchers and two pitchers).

Offense:

The offensive team consists of two batters on the weid side and flip side. When a ball is hit they run the bases clockwise and counter clockwise depending on what side they are batting on. When a batter reaches a base they are in a live mode situation and can advance additional bases from batters who hit from both the wide side and the flip side creating multi directional base running situations. Each offensive team consists of a nine man lineup. This includes all the fielders and 2 catchers. (Pitchers are not placed in the batters lineup.)

Additional Optional Rules:

a) Weid side base runners cannot steal or lead off any bases when the opposing flip side pitcher is throwing and flip side runners cannot steal or lead off any bases when the weid side pitcher is throwing. If base runner violates this rule he is eliminated from the base however an out is not recorded.

b) Base runners on 1st base cannot steal or lead off a base if they have a base runner on the opposing flip or weid side 3rd base. If base runner violates this rule he is eliminated from the base however an out is not recorded.

c) Base Runners on 3rd base on both sides cannot lead off a base at anytime. If base runner violates this rule he is eliminated from the base however an out is not recorded.

d) Only the base runner on the 3rd base in which his diamond pitcher is throwing on can advance to home plate on a passed ball or wild pitch. If base runner violates this rule he is eliminated from the base however an out is not recorded.

e) Base runners cannot deliberately interfere with a thrown ball. This is called INFRINGING and he is eliminated from the base however an out is not recorded. If a base runner unintentionally interferes from a thrown ball the base runner is out or safe depending on the outcome of the play thereof (same as traditional baseball).

f) If two base runners advance home plate at the same time and enter the batters circle at the same time and an out is made no runs will be counted (this applies only during the last out of the inning). All other scoring situations apply (same as traditional baseball)

g) The ball that is being used by the pitcher on the rubber is only allowed to be used to pick off base runners and is the active ball until the other pitching sequence begins. The change of sequence is determined when the pitcher places his foot on the rubber to begin his pitching windup. As soon as this takes place the other ball is dead. Only the base runners on the pitchers diamond side are allowed to lead off and/or steal.

h) Both teams can tag up on all bases during a caught fly ball except for the opposing base runner on 3rd. If base runner violates this rule he is eliminated from the base however an out is not recorded.

i) Four outs per inning to allow the inning to manifest in intensity. This translates to 7 innings for an entire game (28 outs per side). If this method is used as bonus innings; Two (four out innings) would be comparable to 3 (3 out innings) For example, if you applied this method to the 7th and 8th innings you would not play the 9th inning.

Additional Strategies:

j) The purpose of this technique is to avoid the possibility of causing a throwing interference with conflicting base runners. Fielders can devise a strategy to effectively throw out a player at 1st base if a base runner is on or rounding the opposing 3rd base. This technique is called BRIDGING in which a fielder throws the ball to the 2nd baseman (or pitcher) who then completes the throw to 1st base to make the out. (similar to a double play move without the intent to make the out at 2nd base).

k) Catchers who are in play during the pitch become the front catcher. Their role is to defend both plates during any incoming throws. The opposing catcher's role is to back up the play and to assist when necessary. In the event of a wild pitch or passed ball the opposing catcher protects the plate while the fielding catcher retrieves the ball. (This eliminates the need for the pitcher to cover home).

l) Base runners should maintain a strict path within the baselines. Rounding bases should be avoided as much as possible to avoid collisions. Considering The "XFACTOR"—

This occurs on the 2nd base and home plate base lines where the baselines cross. When abiding by the no lead off rule will not allow interference on 2nd base. When base runners advance home plate at the same time they need to coordinate with each other not to create a collision.

Comments:

m) The entertainment value of this version is excellent. Spectators will experience watching exciting base running situations that have never been seen before in the history of the sport.
n) This version demands intense concentration on the infielders to react correctly when a ball is hit to them.
o) This version allows a team that is behind by as many as seven runs to tie the game with clutch hitting. A DOUBLE GRANDSLAM would score 7 runs. This would be very rare however due to the many factors involved in loading both sides. Most likely runs would score or batters would be thrown out before this happens. Most probable would as many as 4 base runners at the same time making for a 5 run GrandSlam opportunity.
p) If this version were to be played in its entirety and using 4 outs per inning the game would consist of 7 total innings.
q) If this version was to be added during the 5th inning and ninth inning of a version of the game the team that is losing would bat first in the 5th inning and the team that is winning would bat in the ninth inning. By having the team that is winning bat 1st in the ninth inning eliminates the chance of having a ½ ninth inning game.
r) Color coded helmets would be used for batters who bat on the different sides to eliminate confusion. Different color balls may be used these for the flip side pitchers.

Other versions of the game may use circular or other type geometric shapes of any shape to use for the running baselines and/or field, as well as different numbers of bases for the teams if desired.

As will be apparent to persons skilled in the art, such as a person in the baseball game industry, computer programmer or other similar-type individuals, various modifications and adaptations of the structure and method of use above-described will become readily apparent without departure from the spirit and scope of the invention, the scope of which is defined in the claims. Although the foregoing invention has been described in detail by way of illustration and example, it will be understood that the present invention is not limited to the particular description and specific embodiments described but may comprise any combination of the above elements and variations thereof, many of which will be obvious to those skilled in the art. Additionally, the acts and actions of fabricating, assembling, using, and maintaining the preferred embodiment of this invention is well known by those skilled in the art. The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the future claims are therefore intended to be embraced therein.

I claim:

1. A method of playing extreme baseball on a playing field, the playing field further comprising a substantially horizontal planar surface, and;
   at least six bases for runners, and;
   at least one home plate for runners, and;
   at least four lines in a predetermined configuration connecting the bases marked on the substantially horizontal planar surface, and;
   further comprising at least one infield and at least one outfield delineated by the lines connecting the bases,
   the method comprising steps of playing conventional baseball modified by at least the following steps:
   a) Establishing that general baseball rules apply:
   3 outs per team per inning, 4 balls=walk 3 strikes=out, 1st two foul balls are strikes, 9 innings per game, and;
   b) Establishing Half-time: Like football or basketball etc., this baseball version will consist of a half-time segment to allow the players to rest and the segment will take place after the 6th inning and the segment duration can last 10-20 minutes which can be determined at the beginning of each game, and;
   c) causing two opposing teams to be playing on the playing field at the same time consisting of two fielding teams, Team A and Team B, and two batting teams, Team A and Team B, and;
   d) causing Team A and Team B to alternate pitches to the opposing batting teams after each pitch is thrown, and;
   e) further comprising causing Team A Batters to use the home batting plate on the right side of the field and Team B Batters use the batting plate on the left side of the playing field, and;
   f) further comprising causing Team A batters to run the bases in the counter clockwise direction, and;
   g) further comprising causing Team B batters to run the bases in the clockwise direction, and;
   h) further comprising causing Team's A and B base runners to use the base located inside of the base line for the 1st Base and use the base on the outside of the baseline for the 3rd Base, and;
   i) further comprising causing Team A base runners to use the base on the left side of the field for the 2nd Base and Team B to use the base on the right side of the field for the 2nd Base, and;
   j) further comprising causing Team A and B base runners and fielders to use an extended "Fielding 1st Base" in a predetermined configuration to field the initial hit ball, and;
   k) further comprising causing if the base runner wishes to run extra bases during the initial hit the base runner is allowed to advance from the extended 1st Base, and;
   l) further comprising causing if the base runner chooses not to advance from 1st base the base runner then stays on the extended 1st base and the game resumes, and;
   m) further comprising causing Team A Batters to use the home batting plate on the right side of the field and causing Team B Batters to use the batting plate on the left side of the playing field, and;
   n) further comprising causing Team A and Team B to use a separate home plate for scoring and fielding, and;
   o) further comprising causing that Team A and Team B innings are over when both teams have made 3 outs, and;
   p) further comprising causing the fielding team that made 3 outs first leave the playing field until the opposing team makes their 3 outs, and;
   q) further comprising causing the teams to play simultaneously during each inning, as there is not a top or bottom of innings as in traditional baseball, and;
   r) further comprising causing Team A and Team B to use a playing mode in effect further comprising when a pitchers foot is on a mound during a pitch rotation, wherein this play mode base runners, in exception to runners on 3rd base, may lead off their base and may be picked off, and;

s) further comprising causing Team A and Team B 3rd base runners may not lead off the base until the pitcher advances his throw towards the batter, and;

t) further comprising causing Team A and Team B base runners that are not in playing mode, according to above conditions, to stand on a bag, wherein if they leave the bag for any reason during this mode they are out, and;

u) further comprising causing Team A and Team B fielders that are not in playing mode, according to above conditions, to remain still, wherein if they make any moves in any direction in which they interfere with the play at hand ten the hitter and all other base runners, if any, are safe, and;

v) further comprising causing an exception to the condition above only when a play advances to the home plate, and;

w) further comprising causing when a base runner advances to home base the opposing teams hitter and team mate catcher must leave the batting circle, and;

x) further comprising causing if the opposing teams' hitter interferes with the play the base runner is safe at home, while if the teams' catcher interferers with the opposing teams catcher then the base runners is out at home, and;

y) further comprising causing if Team A and Team B batters ball hits one of their own fielding team members after hitting a ball then the batter is automatically out the base runners, if any, must return to their original base, and;

z) further comprising causing the game to be played until either Team A or Team B scores more runs than the other in the total innings desired, thereby a winner of the game is determined by the most runs in the total innings.

* * * * *